US007966194B2

(12) United States Patent
Iyer

(10) Patent No.: US 7,966,194 B2
(45) Date of Patent: Jun. 21, 2011

(54) METHOD AND APPARATUS FOR TARGETED EVENT NETWORKING

(75) Inventor: Mangala Iyer, San Jose, CA (US)

(73) Assignee: Trendy Technologies, Inc., San Jose, CA (US)

( * ) Notice: Subject to any disclaimer, the term of this patent is extended or adjusted under 35 U.S.C. 154(b) by 0 days.

(21) Appl. No.: 11/718,171

(22) PCT Filed: Oct. 28, 2005

(86) PCT No.: PCT/US2005/037973
§ 371 (c)(1),
(2), (4) Date: Mar. 21, 2008

(87) PCT Pub. No.: WO2006/049905
PCT Pub. Date: May 11, 2006

(65) Prior Publication Data
US 2009/0018903 A1    Jan. 15, 2009

(51) Int. Cl.
*G06Q 10/00* (2006.01)
(52) U.S. Cl. ....................................................... 705/1.1
(58) Field of Classification Search .................... 705/1.1
See application file for complete search history.

(56) References Cited

U.S. PATENT DOCUMENTS

| | | | | |
|---|---|---|---|---|
| 4,654,793 | A * | 3/1987 | Elrod | 705/1.1 |
| 5,936,542 | A * | 8/1999 | Kleinrock et al. | 340/5.61 |
| 7,209,153 | B2 * | 4/2007 | Lehman | 345/473 |
| 7,523,385 | B2 * | 4/2009 | Nguyen et al. | 715/200 |
| 7,538,745 | B2 * | 5/2009 | Borovoy et al. | 345/7 |
| 2002/0046076 | A1 * | 4/2002 | Baillargeon et al. | 705/8 |
| 2002/0111845 | A1 * | 8/2002 | Chong | 705/8 |
| 2002/0156848 | A1 * | 10/2002 | Grouse | 709/204 |
| 2003/0156135 | A1 * | 8/2003 | Lucarelli | 345/757 |

(Continued)

OTHER PUBLICATIONS www.goclubexe.com; retrieved from www.archive.org any linkage Apr. 1, 2004.*

(Continued)

*Primary Examiner* — Traci L Casler
(74) *Attorney, Agent, or Firm* — Michael A. Glenn; Glenn Patent Group

(57) ABSTRACT

A method and apparatus that eliminates blind networking and allows targeted networking amongst event attendees, both for personal as well as professional reasons, while also making events ubiquitously available anytime anywhere beyond the physical limitations of time and space, such that anyone anywhere in the world can not only attend the event from the comfort of his office desk or home but also network with the other event attendees without physically attending the event is disclosed. Event hosts can be any non-profit/for-profit organization or entity hosting events of any nature in any realm. Another embodiment of the invention provides enhanced, multiple levels of profile content privacy that give complete freedom, control, and flexibility to the users to express themselves fearlessly by controlling the specific chosen contents in their profiles for input, storage, analysis, retrieval, and/or display to specific chosen authorized users or groups. Another embodiment of the invention provides integration in a chat/instant messaging to allow a user to set up an online meeting with one or more participants in the chat and/or that allows a user to find a meeting place where one or more participants can decide to meet in person locally or globally in various parts of the world. Another embodiment of the invention is related to sales and revenue generation, particularly for e-commerce/e-services companies whose products or services, which include but not limited to, yellow page, directory, or business information databases by area, reach large numbers of users directly.

19 Claims, 11 Drawing Sheets

U.S. PATENT DOCUMENTS

| | | | |
|---|---|---|---|
| 2003/0233270 A1* | 12/2003 | Buss | 705/10 |
| 2004/0049424 A1 | 3/2004 | Murray et al. | |
| 2004/0077367 A1 | 4/2004 | Sama et al. | |
| 2004/0093234 A1* | 5/2004 | Bondi et al. | 705/1 |
| 2004/0111360 A1* | 6/2004 | Albanese | 705/38 |
| 2005/0034079 A1* | 2/2005 | Gunasekar et al. | 715/753 |
| 2005/0187956 A1 | 8/2005 | Sylvester et al. | |
| 2005/0209914 A1* | 9/2005 | Nguyen et al. | 705/14 |

OTHER PUBLICATIONS goClub, "Event Registration & Online Membership Management Software—goClub", web.archive.org/200410210335490/http://goclubexe.com, Oct. 21, 2004 homepage.

* cited by examiner

|  | | Hide From: Event Attendees | Hide From: Public |
|---|---|---|---|
| Event Date: | | | |
| Event Location: | | | |
| Name*: | John Doe | ☐ | ☐ |
| *Trendy!* Name*: [Your screen name for others] | First Name ▽ | | ☑ |
| *Trendy!* Event Code*: [Required to attach profile to this event] | Xy123z | Hidden | Hidden |
| Current Information: | | | |
| Residing Country*: | United States of America ▽ | | |
| City*: | Alexandria | | |
| State/ Province*: | virginia | | |
| Zip / Post code*: | 22313 | | |
| Company/ Organization*: | USPTO | ☐ | ☑ |
| Industry*: | Information Technology ▽ | | |
| Professional Title*: | Patent Examiner | ☐ | ☐ |
| Brief Description*: | ⦿ Just exploring new contacts<br>○ Have job opportunities<br>○ Looking for job opportunities<br>○ Have urgent needs<br>○ Witty 1-liner | | |
| Current Needs: | Would love to network with those who attended the IP Patent Strategy Seminar the other day. | ☐ | ☐ |

*FIG. 2*

Introduce Me:

The following message will be sent along with your profile as shown below. You may change the message or profile/ check/ uncheck privacy boxes depending on what you wish to send to this particular person:

[Send] [Preview] [Cancel]

Hello: I came across your profile and would like to introduce myself. Please

Hide:

My Email Address*: ☐
My Phone Number: ☐

Name*: [Please Select] ☐
*Trendyl*™ Name*: [First name] ☐
Residing Country*: [Please Select] ☐
City*: ☐
State/ Province*: ☐
Zip / Post code*: ☐
Company/ Organization*: ☑
Industry*: [Please Select] ☐
Professional Title*:

Brief Description*:
○ Just exploring new contacts
○ Have job opportunities
● Looking for job opportunities
○ Have urgent needs
○ Witty 1-liner

*FIG. 3*

Welcome, Demo

[Sign Out]  [Change Password]  [FAQs]

!Trendy!
EMPOWERING THE WORLD TO TRIUMPH

[Home]  [Search]  [Events Networking™]  [Professional Networking™]  [Personal Networking™]

Preferences | Saved Searches

Ready to connect with people worldwide? 1-2-3 Fast-n-Comprehensive search below:

1 - Select  »  2 - Set Criteria  »  3 - Go

All Users
Professional Contacts
Personal Contacts
Events

Keywords: [_____]   ● *Any Keywords*  ○ *All Keywords*

Residing Country: [ANY ▽]
City: [_____]
State/Province: [ANY ▽]
Zip/Post code: [_____]
My Trendy! Event(s): [ANY ▽]

SAVE search preferences:  ○ Yes   ● No

Save as: [_____]                                           [GO]

FIG. 5

Welcome, Demo
[Sign Out] [Change Password] [FAQs]

*iTrendy!*

EMPOWERING THE WORLD TO TRIUMPH

Home | Search | Events Networking™ | Professional Networking™ | Personal Networking™

Preferences | Saved Searches

Ready to connect with people worldwide? 1-2-3 Fast-n-Comprehensive search below:

1 - Select  »  2 - Set Criteria  »  3 - Go

All Users
Professional Contacts
Personal Contacts
Events

Keywords: [_____]  ⦿ *Any Keywords*  ○ *All Keywords*

Residing Country: [ANY ▾]
City:
State/ Province: [ANY ▾]
Zip code/ Post code:
Professional Title:
Industry: [ANY ▾]
Company:
My Trendy! Event(S): [ANY ▾]

    

Home | Search | Events Networking™ | Professional Networking™ | Personal Networking™

Preferences | Saved Searches

Ready to connect with people worldwide? 1-2-3 Fast-n-Comprehensive search below

1 - Select >>> 2 - Set Criteria >>> 3 - Go

All Users
Professional Contacts
Personal Contacts
Events

Keywords: [ex: hiking, stanford]  [    ]
⦿ Any Keywords  ○ All Keywords

[GO]

| | |
|---|---|
| Residing Country: | ANY ▾ |
| City: | |
| State/ Province: | ANY ▾ |
| Zip / Post code: | |
| Ethnic Community: | ANY ▾ |
| Looking For: | ANY ▾ |
| Age group: | ANY ▾ |
| Status: | ANY ▾ |
| Gender: | ANY ▾ |
| Occupational/ Indstury: | ANY ▾ |
| Diet: | ANY ▾ |
| Smoking: | ANY ▾ |
| Drink: | ANY ▾ |
| My Trendy! Event(s): | ANY ▾ |

Save search preferences:  ○ Yes   ⦿ No

Save as: [    ]

*FIG. 7*

Welcome, Demo
[Sign Out] [Change Password] [FAQs]

Trendy!
EMPOWERING THE WORLD TO TRIUMPH

[Home] [Search] [Events Networking™] [Professional Networking™] [Personal Networking™]

Preferences | Saved Searches

Ready to connect with people worldwide? 1-2-3 Fast-n-Comprehensive search below.

1 - Select  »  2 - Set Criteria  »  3 - Go

All Users
Professional Contacts
Personal Contacts
Events

Event Name: [                    ]
Event Type: [ANY ▾]
Event Industry: [ANY ▾]
Country: [ANY ▾]
City: [          ]
State/Province: [          ]
Zip/Post code: [   ] [   ]
Start Date: [28-Oct-2004]
End Date: [28-Oct-2006]

Save search preferences:  ○ Yes  ⦿ No

Save As: [                    ]

METHOD AND APPARATUS FOR TARGETED EVENT NETWORKING

BACKGROUND OF THE INVENTION

1. Technical Field

The invention relates to event networking. More particularly, the invention relates to a method and apparatus for targeted event networking.

2. Description of the Prior Art

Event Networking

Millions of people worldwide attend tradeshows, conferences, expositions, conventions, individual or group parties, and other events of such nature that bring them together for various common purposes, such as marketing and selling new products, educational seminars and workshops, charity and fund raising, sports and movies, etc. For all those attending such events, one of the most critical reasons behind their attendance is to make new connections with other event attendees who can then help them in fulfilling professional and/or personal needs.

In today's world, most event hosts organize special networking sessions for certain duration of time to allow event attendees to interact with each other and make new connections. While this is a great way of bringing people with similar interests together under the same roof for networking and other purposes, such an age-old traditional process has several critical limitations that restrict event attendees from maximizing their return on investment of their time, energy, money, etc.

For example, when someone enters a room full of event attendees, there is no way for him to know who in the room meet his needs. In such a scenario, one has to go about introducing oneself to however many people one can within the short duration of time available for networking. This scenario is referred to herein as blind networking because, in the absence of prior detailed knowledge about each attendee, networking leads to blind and random encounters.

Very few event hosts take the extra step of publishing a list of event attendees' names, email addresses, etc. to help the attendees in getting to know each other. But even this has critical limitations because such lists have very limited information and neither serve the purpose of providing a detailed understanding of each attendee's exact needs nor allow comprehensive filtration and organized storage of information concerning need-based attendees to allow such attendees to be contacted before, during, or after an event. Also, such lists give rise to privacy issues because they sometimes' fall into the wrong hands who misuse the sensitive information they contain.

Another set of event management products that are available allow for online registration services, sending of event invitations, and various backend management tasks with regard to attendee data collected for marketing or other promotions for the event hosts, but such products severely lack a focused and comprehensive method and system to allow networking amongst attendees before, during, or after the events. Even worse, some of the major events of the world that draw thousands of attendees, such as a baseball game or a musical concert, have absolutely no method or system to let all like-minded people with similar interests get to know one another before, during, or after the event, unless the attendees themselves take the pain to introduce themselves physically to the limited number of surrounding people during the game or concert. For many, this act of moving from their seats to go about introducing themselves is somewhat odd and very distracting, it takes their focus off the game or concert and into people networking, and the end result is that they refrain from networking, even though they would really love to get to know all those attending, e.g. for reasons of fun, making friends, dating, getting the next big job, or whatever.

Thus, the methods and/or systems adopted traditionally at events are not comprehensive, efficient, ubiquitous, and/or cost-effective enough to serve the purpose of targeted networking.

Profile Content Privacy Control

Another problem associated with event networking is that of privacy. Many computer based software or handheld device based applications, such as those used in e-commerce or e-services today, allow filling of an individual's profile, organization's profile, profile of an object/commodity, and/or any other item or thing to store, display, analyze, or report such information for various reasons. Managing the privacy of such information input, storage, usage, and display has always been a delicate, challenging, and complex issue for both the users of such product, applications, or services and owners. Some automated approaches allow for data encryption and security methods and systems for input, storage, retrieval, and exchange of information but not necessarily the much-needed privacy systems and methods that allow the user to control the content input and its controlled display to others.

The most commonly used privacy system or method so far for profile content control by the user only allow for displaying the entire profile to the public or keeping it private. Another method or system used in some e-services allows displaying the profile to the people, whom they have invited to join their electronic network, based on the degrees of separations. For example, display profile to people in my first degree of connections and/or second degree, and so on. Conversely, a profile can also be hidden or kept private from people in such network based on degrees of separation.

Thus, privacy issues are a major concern in event networking.

Integration with a Chat Application or Instant Messenger

Another concern with regard to event networking is that of communication. The evolution of online chat applications and instant messengers in the recent years has had a hugely positive impact in the lives of the people worldwide. As the usage of Internet increases, the ubiquitous nature of the chat and instant messenger products is successfully bringing people closer to each other beyond the physical limitations of time and space.

There have been remarkable inventions in chat and instant messaging. However, a starkly visible problem in the currently available chat/instant messaging products or services is that there is yet no method and system of integration to finding a meeting place or other businesses/services in a particular location and also have an integrated ability to have a online meeting, directly from within the chat application or instant messaging system in one step.

For example, Yahoo offered a chat/instant messaging product for businesses called Business Messenger that was recently discontinued, and that had an online meeting product called Web-ex integrated into the messenger. This product allowed corporate executives to chat, share files, and open up a file which all the participants could simultaneously read and see live as the edits were made or as demonstrated by the host. However, a painful problem that might have been traditionally overlooked is that the messenger still lacked the ability to be able to find instantly, from within the chat application in one step, a common meeting place for all the participants in the chat if they all decided to meet in person.

Another example is the popular Yahoo messenger for the individuals worldwide that is available for free download on yahoo.com. The only way to find a meeting place, such as a coffee shop, from within the chat application in the US in a particular city, such as San Jose, is to type appropriate keywords in the search bar built in the bottom of the instant messenger and click a search button. This opens up another browser page with the results.

On the top of that page is the link to local which one then clicks, types in the address or city or state, and hits search again to narrow down the results. Thus, clearly it is a multiple step, time consuming process, especially if other participants in the chat might be waiting for this person to tell them a meeting place where all can meet.

In fact, if one wants to find a meeting place in Paris using Yahoo chat/instant messaging from the U.S. it is even more convoluted and sometimes even impossible.

Sales and Revenue Generation in E-Commerce or E-Services Providing Directory Services or Local Listings Another concern with event networking is the use of such networking to produce sales and generate revenue by providing directory service or local listing to personal network participants. The Internet is fast penetrating into human lives resulting in a huge dependency on this medium by the people worldwide for almost all kinds of daily activities, such as finding books, buying and selling items, travel/transportation/lodging reservations, conducting searches on all kinds of topics, etc. When it comes to finding a coffee shop or address of a hotel in a city, people in today's Internet era heavily resort to e-commerce sites, such as Yahoo! yellow pages or Google's new service called Google local. Such sites get millions of hits worldwide every month and have successfully demonstrated huge win-win scenarios using targeted advertising as a revenue stream for the consumer and the advertiser. As far as revenue generation is concerned, there is a consistent need for companies all over the world to keep on innovating new methods and systems of generating revenues while lowering the expenses, increasing profitability, and thus maximizing their return on investment.

To increase sales and generate revenues, it is needless to say that companies have a sales force wherein a significant amount of money is spent in hiring, training, and employing the right sales people. However, not all companies are blessed with huge funds, especially in the early years of their incorporation, such that they are able to employ a large number of sales people to meet their goals. This can severely constrict a company's growth rate or even lead them to set goals based on the limited resources available, which could specifically even factor in the number of sales people available during that period. Although, some may consider this as a traditional problem that all early stage companies go through, however, today's fast changing economic conditions worldwide constantly demand innovative approaches to fasten the revenue generation roadmap while keeping the expenses low and still solving the traditionally overlooked severe bottlenecks. It would be advantageous to provide a technique that addresses such issues.

SUMMARY OF THE INVENTION

A first embodiment of the invention comprises a method and apparatus that eliminates blind networking and allows targeted networking amongst event attendees, both for personal as well as professional reasons, while also making events ubiquitously available anytime anywhere beyond the physical limitations of time and space, such that anyone anywhere in the world can not only attend the event from the comfort of his office desk or home but also network with the other event attendees without physically attending the event. Event hosts can be any non-profit/for-profit organization or entity hosting events of any nature in any realm.

Another embodiment of the invention provides enhanced, multiple levels of profile content privacy that give complete freedom, control, and flexibility to the users to express themselves fearlessly by controlling the specific chosen contents in their profiles for input, storage, analysis, retrieval, and/or display to specific chosen authorized users or groups, as opposed to the commonly used methods/systems of privacy setting to display entire content to everyone, no-one, or someone as mentioned above in connection with the prior art.

An additional embodiment of the invention provides integration in a chat/instant messaging to allow a user to set up an online meeting with one or more participants in the chat and/or that allows a user to find a meeting place where one or more participants can decide to meet in person locally or globally in various parts of the world.

Another embodiment of the invention is a method and apparatus for sales and revenue generation, particularly for e-commerce/e-services companies whose products or services, which include but not limited to, yellow page, directory, or business information databases by area, reach large numbers of users directly.

BRIEF DESCRIPTION OF THE DRAWINGS

FIG. 2 is a screen shot showing privacy settings and displaying horizontal and vertical levels of privacy settings allowed in a profile;

FIG. 3 is a screen shot showing privacy settings and displaying horizontal and vertical levels of privacy settings allowed in a profile to customize each before sending to different individuals;

FIGS. 5-8 are screen shots showing a search module according to the invention;

DETAILED DESCRIPTION OF THE INVENTION

Event Networking

A first embodiment of the invention comprises a method and apparatus that eliminates blind networking and allows targeted networking amongst event attendees, both for personal as well as professional reasons, while also making events ubiquitously available anytime anywhere beyond the physical limitations of time and space, such that anyone anywhere in the world can not only attend the event from the comfort of his office desk or home but, most importantly, also network with the other event attendees without physically attending the event. Event hosts can be any non-profit/for-profit organization or entity hosting events of any nature in any realm.

Figure 1:
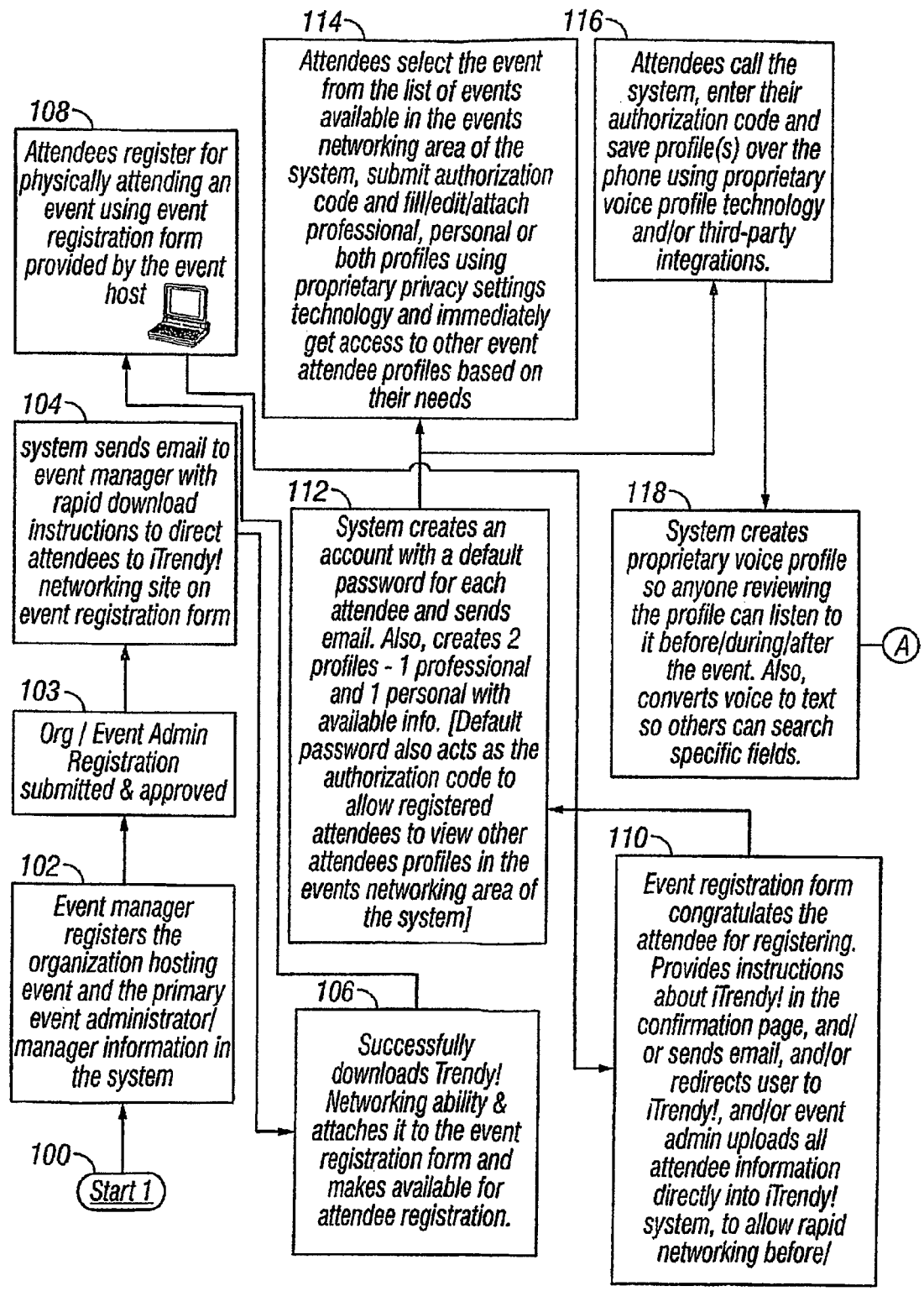
FIG. 1 is a partial flow diagram of an event networking method and apparatus according to a preferred embodiment of the invention.
Figure 1:
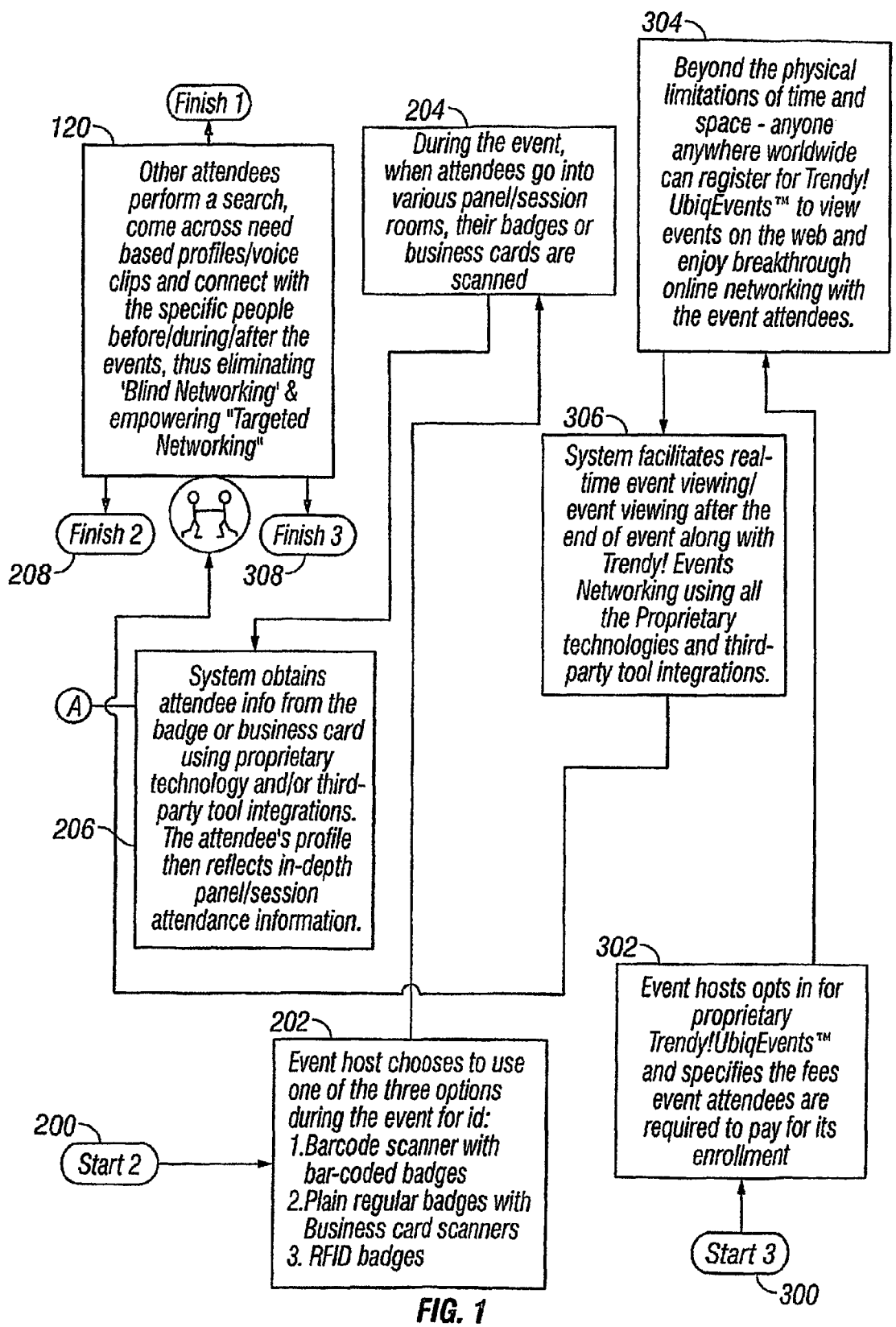

The various steps in this embodiment of the invention are as described below in connection with FIG. 1:

The process starts (100) and the event manager registers the organization hosting the event and the primary event administrator/manager in the system (102).

Alternatively, the process can also start with the registration of the event host(s), event manager(s), event(s) information into the system via collaboration with third party systems including but not limited to online registration systems, online ticketing systems, other systems maintained by event organizers or their service providers.

In yet another flow, the process can also start with a search engine crawling the web and/or a network of computers, and loading the event host(s), event manager(s), event(s) information into the event networking system.

After successful registration of the organization and the event administrator (103), the system sends email to the event manager with rapid download instructions to direct attendees to the system from the event registration form (104).

The event host successfully adopts the method, such as downloading the system features, and attaching these to the event registration form to make them available during attendee registration (106).

The attendees register for physically attending an event using the event registration form provided by the event host (108).

The event registration form includes information that congratulates the attendee for registering; provides instructions about the system in the confirmation page and/or sends email and/or redirects user to the system and/or event administrator uploads all attendee information directly into the system to allow targeted networking before, during, or after the event (110).

The system creates an account with a default password for each attendee and sends it to the attendee in an email. Also, the system creates two profiles, i.e., a professional profile and a personal profile, with the available information. The default password also acts as the authorization code to allow paid/registered attendees to view other attendees' profiles in the events networking area of the system. (112)

The organizer also has an option not to pre-load the attendee data if for some privacy reason they do not want to share attendee information before hand. In one such scenario, the system allows the event manager to create one event code per event. The event code is commonly sent to all the attendees, along with a hyperlink directing them to the system to sign-up and enter profiles by themselves. The system also allows for advanced security, wherein an event manager can choose to send one unique event code per event per attendee, instead of the same code to all attendees, along with a hyperlink directing attendees to the system to sign-up and enter profiles themselves. In another scenario, the event networking system sends out a secure hyperlink to the attendees, instead of event codes, which they click to get registered into the system. In another scenario, this secure link for the attendees to register need not necessarily be sent by the event networking system. Instead this can be sent by third party collaborations including but not limited to online ticketing systems, online registration systems, event management/service providers.

The attendees select an event from the list of events available in the events networking area of the system, submit an authorization code, and fill/edit/attach the professional, personal, or both profiles using proprietary privacy settings technology, as described below in connection with the apparatus and method for profile content privacy control, and immediately get access to other event attendee profiles based on their needs. (114) Alternatively, when an attendee signs-up/registers or logs in, the system detects which event he/she belongs to and directly shows the professional/personal profile entry form with partially loaded data which can be further filled-out by the attendee.

Attendee information can be loaded into the event networking system by the attendee, event host(s), any authorized individual or the system itself with or without collaboration with third parties including, but not limited to, online registration, online ticketing systems, and attached to the corresponding event at any time either before, during, or after the event.

The attendees can also call the system, enter their authorization code, and save profile(s) over the telephone using proprietary voice/video profile technology and/or third-party integrations. (116) In such a case, the system creates a voice/video profile so that anyone reviewing the profile can view/listen to it before, during, and/or after the event. Also, the system converts voice to text/text to voice so that others can search specific fields. (118)

Other attendees perform a search, come across need based profiles/voice/video clips, and connect with the specific people before/during/after the events, thus eliminating blind networking and empowering attendees with targeted networking. (120) This completes the process. (122)

In another embodiment (200), where the process flow allows in-depth panel/session level networking, the event host chooses to use one of the three options during the event for the user's identification (202):

Barcode scanner with bar-coded badges;
Plain regular badges with Business card scanners; and/or
RFID badges.

During the event, when attendees go into various panel/separate session rooms their badges, their badges and/or business cards are scanned. (204)

The system obtains attendee information from the attendee's badge or business card using proprietary technology and/or third-party tool integrations. The attendee's profile then reflects the in-depth panel/session level attendance information. (206)

Panel/session level information data entry, storage, and exchange amongst event attendees can also be accomplished using the following steps:

The event host submits the panel/session information, such as room, date, time, etc. in the system to be viewed by any attendee or prospect worldwide.

After entering the profile information, either personal or professional, the system includes a form where physical or ubiquitous events attendees can fill out information about the panel/session they plan to attend/already attended, etc. before, during, or after the event. A system search also allows finding need based profiles inside each session or panel.

As with the previous embodiment, other attendees perform a search, come across need based profiles/voice/video clips, and connect with the specific people before/during/after the events, thus eliminating blind networking and empowering attendees with targeted networking. (120) This completes the process. (208)

In yet another embodiment (300), the event host opts-in (302) for turning the event ubiquitous beyond the physical limitations of time and space, along with the proprietary events networking system, to allow anyone anywhere worldwide to either attend (304) the event in real-time, watch video/audio-streams after the event or, most importantly, network with the physical event attendees and/or ubiquitous event attendees from the comfort of their home or office anywhere in the world (306). Thus, people who are unable to attend a baseball game, a musical concert, or a favorite conference physically for various reasons still benefit from the invention by making new connections with like-minded people with similar interests easily, ubiquitously, efficiently, and cost-effectively while fully maximizing their return on investment of money, time, energy, etc. Ubiquitous event attendees are defined herein as those individuals who are remotely attending the event and/or those who're simply choosing to network with the attendees of the event, e.g. a business man in China who is unable to attend a conference in New York but wants to network with those who attended to establish business contacts. Another example is a music concert fan or a sporting event fan who did not physically attend the event but; perhaps watched the event on TV, or even without watching it simply wants to network with those who attended the event to establish personal/dating contacts.

As with the previous embodiments, other attendees perform a search, come across need based profiles/voice/video clips, and connect with the specific people before/during/after the events, thus eliminating blind networking and empowering attendees with targeted networking. (120) This completes the process. (308)

Furthermore, the invention provides professional networking and event networking while keeping the two separate from each other, thus creating a one stop people networking platform for the world to benefit from anytime anywhere. This allows the event attendees, who have used the invention for networking with other attendees by attending a physical event or a ubiquitous event, and/or who are members of the system, to invite their friends and contacts to explore the new ways of attending and/or networking at events. Some or all of those contacts may become a member of the system, who can then spread the word to their other contacts and so on, thus forming an unlimited chain of people, to tap into when needed, in one's professional network and/or one's personal network while keeping the two completely separate. For example, an attendee can invite a professional co-worker via some form of communication or via using the invitation method of the system, who then becomes a member of the system to explore networking with attendees of his favorite events anytime, anywhere in the world either for professional, personal or both reasons.

In connection with this embodiment, the invention thus provides a method and apparatus for professional networking and/or personal networking including, but not limited to:

Filling out and storing a professional profile and/or a personal profile, using proprietary privacy settings, in the respective separately allocated areas/menus/modules;

A sub-navigation area/folder to select and/or pay for priority listing features;

A sub-navigation area/folder to store invitations sent and corresponding profiles as sent to each;

A sub-navigation area/folder to store invitations received and corresponding replies/profiles as sent to each received invitation;

A sub-navigation area/folder to invite contacts, view accepted invitations, rejected invitations, and all the people in one's network professional and/or personal (in separate areas, as mentioned earlier. This also allows for creating sub-networks, for example, a sub-network called 'family' can be created, and appropriate family members can be moved into this, under a My Network sub-navigation area/folder. Similarly, a sub-network called 'co-workers' can be created to allow organizing and grouping the contacts;

A sub-navigation area/folder for messages, with an e-mail box having an inbox, compose, draft, sent, etc. to exchange messages between members in various networks/sub-networks; and A sub-navigation/folder to store references from professional/personal contacts to add extra credibility. References can be stored as a voice file, separate document, a video file, etc.

One reason for keeping the professional and personal information data collection, display, and storage areas separate from each other is derived from an assumption concluded after surveys of random people who alluded to the fact that almost everyone prefers their potential employers not to know much more about their personal lives than what might be volunteered by one. Similarly, almost everyone prefers their personal friends/dating partners not to know much more about their professional lives than what might be volunteered. Hence, someone searching for professional contacts comes across the professional profiles of people as available to the searcher, based on the privacy settings, and never comes across the personal profiles. Similarly, someone searching for personal contacts, such as when dating or activity partners, comes across the personal profiles as available to the searcher, based on the privacy settings and never comes across the professional profiles of the same people. An exception includes a scenario where someone has disclosed information, such as their name in both profiles, and a curious searcher does a cross check in both areas using the name to retrieve both profiles.

Another embodiment of the invention also includes integration not only within a chat/instant messenger as described below, but the invention also comprises similar integration outside of chat or instant messenger anywhere within an application that allows networking or exchange of information between event attendees or any individuals worldwide for professional and/or personal reasons. Such embodiment includes integration that allows users to have an online meeting using the event networking invention or via third-party integration with a provider of online meeting services, such as Web-ex, and/or allows user to find a meeting place or any businesses or services using the event networking invention or via third-party integration providing yellow page-like directory services, amongst other things described in the process steps above, and as shown on FIG. 1.

Another embodiment of the invention also concerns various ways of generating revenues using the method and system of events networking as described herein. One of the many possible ways is by retaining a percentage of the revenues generated by the event hosts who use the herein disclosed event networking/ubiquitous events techniques, and/or by allowing the event hosts to subscribe to the event networking services using a flat fee contract model. Another way is the possibility of including the embodiment discussed in greater detail below for sales and revenue generation in e-commerce or e-services by providing directory services or local listings. Another embodiment of the invention provides a win-n-redeem points program, wherein points are allotted to the users for various reasons, such as logging into the system when the load on the system is low or moderate (based on a system defined set of parameters) and for logging out of the system and revisiting at a later time when the system is experiencing peak load which might result in comparative slowdown in showing results to the users. Points may also be allotted for referring friends, contacts, etc. who become members of the system. Points can be redeemed towards company branded merchandise, such as hats, t-shirts, and other accessories and/or other redemption methods and systems as may be introduced as and when needed.

A further embodiment of the invention addresses allowing individuals worldwide to post their events, such as weddings, parties, etc., invite their friends/contacts, and allow networking before/during/after the events.

Profile Content Privacy Control

Another embodiment of the invention provides enhanced, multiple levels of profile content privacy that give complete freedom, control, and flexibility to the users to express themselves fearlessly by controlling the specific chosen contents in their profiles for input, storage, analysis, retrieval, and/or display to specific chosen authorized users or groups, as opposed to the commonly used methods/systems of privacy setting to display entire content to everyone, no-one, or someone as mentioned above in connection with the prior art.

Per this embodiment of the invention, at the time of input of the user's chosen profile information, such as the profile of an individual, an organization's profile, the profile of an object, material, or commodity, the profile of animals/pets, and/or any other item/thing, to store, display, analyze, or report such information for various reasons, the user is provided with enhanced, multi-level privacy settings. The multi-levels are comprised of horizontal and vertical levels. The horizontal levels include, but not limited to, any, many or all fields in the profile with corresponding privacy selection options to control display of each field content specifically to vertical levels. The vertical levels include, but not limited to, levels such as show to public, and/or show to people in my network/sub-networks, and/or show to people in my closest contacts, and/or show to event attendee contacts. In the presently preferred embodiment of the invention, the horizontal level is comprised of the profile field-level settings, and vertical levels are comprised of groups, such as public, my network/sub-networks, closest contacts, event attendees, and so on. In addition, users have complete control and freedom to create any such vertical groups within the guidelines described by the application, product, or service owners.

Thus, access to the profile content is completely controlled by the user at both the profile level and the field level, with multiple horizontal and vertical privacy levels for each field and/or the entire profile, in addition to the commonly known public and private levels for a profile. Users having certain permissions to any, multiple, or all horizontal and vertical privacy levels are permitted to read a defined group of records, but not necessarily all fields in each record. A sample screen shot of this embodiment is shown in FIG. 2.

Furthermore, when a user introduces himself or decides to send his profile to others, he has another in-depth level of privacy control that allows modification and storage of an instance of the profile both on the horizontal and vertical levels, i.e. each field information can be edited and privacy levels can be customized to that particular user(s)/group to whom he wants to send or display the profile. Such instances of profiles can also be stored, analyzed, and/or retrieved for later references or reporting purposes. A sample screen shot of this embodiment is shown in FIG. 3.

Integration with a Chat Application or Instant Messenger

An additional embodiment of the invention provides integration in a chat/instant messaging to allow a user to set up an online meeting with one or more participants in the chat and/or that allows a user to find a meeting place where one or more participants can decide to meet in person locally or globally in various parts of the world.

The prior art includes online meeting products, such as Web-ex integration with instant messaging, such as the Yahoo business messenger or finding meeting places/businesses/services via an online portal or Web application, but not specifically chat/instant messaging, e.g. Yahoo yellow pages and Google local.

As mentioned earlier, there is no chat/instant messaging product that has online meeting product/service integration and integration of a product/service finding a meeting place locally and/or globally.

The various steps in this embodiment of the invention are as follows:

User A finds User B or more users as a useful contact and decides to have an online chat with one or more users after a mutual consent.

Users chat/exchange some information and exit, or decide to do one of the following:

Have an online meeting using an integrated third-party product/service or a proprietary product/service. Such online meetings are very helpful and cost-effective especially in cases of business conversations.

Have an in-person meeting in which case one of many things can happen:

Case 1: Both are local area residents and decide to meet in a common place in their local area.

Case 2: Both are far apart and decide to meet in a common place to which they might be traveling for attendance at a conference. —OR— Either one decides to fly-in to meet the other, so the other person decides to find a meeting place in his area.

For Case 1, the invention allows the user from within the chat/instant messaging system to have an online meeting from the comfort of his home or office by clicking on the proprietary or third-party product/service integrated within the chat/instant messaging system.

Figure 4:
FIG. 4 is a screen shot showing the finding of a meeting place from within a chat/instant messenger application.

For Case 2, the invention allows the user to enter the name of a business or services, such as meeting place in address, city, state or zip, from within the chat application for finding both locally and/or globally, e.g. someone in U.S. can find out a meeting place in Paris, France, and the results are shown in a separate Web page while keeping the chat session still active, so that the user can return back to the chat to consult with the other participants about the choices of meeting place he may have picked from the search and the user can then finalize his plans. A sample screen shot of this embodiment is shown in FIG. 4.

Sales and Revenue Generation in E-Commerce or E-Services Providing Directory Services or Local Listings This embodiment of the invention is a method and apparatus for sales and revenue generation, particularly for e-commerce/e-services companies whose products or services, which include but not limited to, yellow page, directory, or business information databases by area, reach large numbers of users directly.

This embodiment of the invention allows each, all, or many of the individuals who have access to the product or service to act like a salesman or, more so, as an evangelist in which the company and the individual both make money. Such individuals specifically sign-up local businesses in their area, such as coffee shops, bars, etc. to get listed in the company's Website if and where such companies display links to such local listings to be accessed by anyone anywhere or as defined by the company.

The invention provides an embodiment that considers a very important reasoning that someone living in a particular zip code is usually extremely familiar and usually has the best knowledge about the local meeting places or even other businesses. The traditional yellow page/directory books, or even the online yellow page/directories, still have many limitations in that, howsoever comprehensive these are, these traditional methods may still lag behind when localities motivated to make extra money start assimilating such information and start sending them to a company from the comfort of their home anytime anywhere at their own convenience. Thus, this embodiment of the invention creates a win-win-win for the individual, the advertiser, and the company listing them. In today's world, there is no such method and apparatus available. For example, the two well-known companies, Yahoo, Inc. and Google, Inc., provide services such as yellow pages or Google local, where individuals search to find a restaurant, meeting place, or any such directory assistance related services. However, there is no program available to allow such individual users of Yahoo or Google to bring business owners in their local area while making commission money.

The various steps in this embodiment of the invention are as described below:

Any individual signs up to get qualified as an evangelist for the company.

The company reviews the individual's information and enrolls the person into the program, if he is found eligible, based on set criteria including the local laws.

The individual then follows the instructions as sent by the company and enrolls a local business in his area to get listed in the company's product or service that can then be made visible to millions of people worldwide.

The individual then spreads the word to his friends who too want to make extra money and enroll in the program.

If the business or service is a meeting place, such as a coffee shop or bar, then the meeting place owner can also sign up for a fee or for free to allow their visitors/customers to network with each other. This part of the invention involves an authorization code that is given to each customer, e.g. at the payment counter after receiving the payment. For added security and to avoid passing around of the code to wrong hands, each individual gets a different code that can be used only once by the individual to sign-up in, during which the individual sets up his own password, posts his professional/personal profile, and is able to search/view profiles of other visitors who might meet his needs and make connections. Owners can also choose another method to allow the visitors to sign-up at or near the payment counter, using the system loaded on a computer which may or may not be Web-based, or via telephone using the first name and last name as in the user's driver's license after verifying his identity. Such information is later uploaded into the system and made available for the customers to get to know each other anytime anywhere using an Internet based application with appropriate privacy settings.

Thus, some of the key advantages of this embodiment of the invention are as below:

Millions of users potentially acting as sales force, hence less overhead for the company in the sales force payroll. This allows companies to go beyond the present limitations of a limited sales force and reap the benefits of an unlimited sales force, particularly in bringing local business owners to list or advertise in the company's Website.

Excellent source of income, especially for college students or anyone who likes to make extra money.

This could induce a huge viral effect in increasing the user base for the company by potentially turning each signed user into a salesman, such as an evangelist who brings not only local business owners but also spreads the word to one's friends, who would then visit the company's Website and potentially enroll in the program to make extra commission money.

The company can then cross-sell and up-sell other products or services to users obtained through this invention, thus leading to new revenue generation.

The company can also generate revenues from businesses or services that also get enrolled to allow their visitors/customers to network and make connections. Such businesses or services also win by getting more information about their customers for targeted advertising or personalized sales and their customers win too because they get to make more connections in a safe and secure environment with full proprietary privacy control settings.

In another embodiment, the invention can be applied for targeted networking amongst members including, but not limited to, groups, organizations, and associations in various industries. In one such scenario, members' profile data are pre-loaded into the system and, depending on the requirements of the group/organization/association, members profiles are attached automatically to one, many, or all of the events, e.g. attended/paid-for/registered-to-attend events, hosted by the organizer.

Another embodiment of the invention provides for an email communication system with access from within or outside of the event networking system.

In all of the above mentioned embodiments, an attendee/user can connect with another attendee/user of his attended event or his physically unattended event (referred to as ubiquitous event attendee herein) including but not limited to the following way:

The event networking system includes a 1-2-3 fast-n-comprehensive search function/module as shown in FIGS. 5, 6, 7, and 8, wherein a user can specify criteria to see all users, or professional contacts only, or personal contacts only, or events only, and get his need-based users or events in the search results. The user then makes an introduction by sending his information using one of the many communication methods provided by the system including, but not limited to, system generated email notification, system generated sms (short messaging system) notification, and/or voice notification. The recipient can choose to reply back by sending his profile using the same communication methods provided to him by the event networking system.

All of the above mentioned embodiments can also comprise a means to allow the user to specify some criteria of interest such that, as when such other users matching the criteria become available, the user can be alerted via electronic notification, e.g. emails or sms.

One embodiment of event search function is shown in FIG. 8. In another embodiment of the events search function one, many, or all events of an event host/organization can be included in the criteria as a selection feature to view host specific events. In yet another embodiment of events search function in an event networking system, a search can be performed to crawl the web or network of computers on the World Wide Web to pick the events happening globally and display the results for the user after indexing and organizing the data. As shown in FIGS. 5,6,7, and 8, the search preferences can also be saved for future use without having to re-type or duplicate selections.

Figure 9:
FIG. 9 is a screen shot showing a sample of search results obtained using the event search function.

FIG. 9 shows a sample of search results obtained from the current embodiment of event search function, as shown in FIG. 8. FIG. 9 also shows two icons, one for professional networking and one for personal networking in front of each event name line record. Using these icons, profiles can be attached by a user to one or more events they have authorization for. The display (or hiding) of one of these icons can be controlled i.e. the choice to allow an attendee to attach either personal or professional or both profiles to the event is controlled by the event host.

Figure 10:
FIG. 10 is a screen shot showing search results grouped in two separate sections.

FIG. 10 shows the search results displaying professional and personal profiles grouped in two separate sections.

Search results include an easy to use sort functionality, such that when a column name is clicked it sorts in ascending and/or descending order which is indicated by a small upward or downward arrow, as can be seen in the FIG. 10.

The invention may be performed in either hardware, including, but not limited to, personal computers, iPods or other MP3 players, cell phones, PDAs, RFID devices, location based GPS systems, and devices with video capabilities, software, or any combination thereof, as those terms are currently known in the art. In particular, the invention may be carried out by software, firmware, or microcode operating on a computer or computers of any type. Additionally, software embodying the invention may comprise computer instructions in any form, e.g. source code, object code, or interpreted code, stored in any computer-readable medium, e.g. ROM, RAM, magnetic media, punched tape or card, compact disc (CD) in any form, and DVD. Furthermore, such software may also be in the form of a computer data signal embodied in a carrier wave, such as that found within the well-known Web pages transferred among computers connected to the Internet.

Although the invention is described herein with reference to the preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for targeted networking amongst event attendees, comprising the steps of:

an event manager accessing an event management module comprising a processor, memory, and a network interface for accessing a network event management module is coupled with a plurality of clients via said network, wherein said plurality of clients comprises plurality of potential attendees and an event host, wherein said management module is further configured with management tools and attendee tools said event host registering into an event networking system using said management tools;

said event host establishing an event networking web-space using said management tools;

said event host configuring said event networking web-space with said attendee tools for allowing attendees the ability to individually register directly for said event networking web-space;

said event host preloading a plurality of attendee information directly into said event networking system via said event networking web-space, wherein said preloaded information is previously stored in said memory;

said event host saving any of professional and personal information into profiles for registered attendees, wherein said profiles are saved in said event networking system; and said event host creating a login account with a username and a password for each registered attendee;

said event host providing said username and said password to each registered attendee; and said event host creating an individual attendee web-space for each registered attendee to display a profile selected from among any of, a professional profile and a personal profile, for said attendees with said attendee's respective professional and personal information currently available in said event networking system;

said attendees registering with a web-space to access at least some information about other registered attendees to allow targeted networking between registered attendees at any of before, during, or after said event;

said event host offering priority features to said attendees in a sub-navigation area of said individual attendee web-space;

said attendees storing in a sub-navigation area of said individual attendee web-space invitations to other users and introductions by other users and profiles sent along with said invitations and introductions;

said attendees storing in a sub-navigation area of said individual attendee web-space invitations and introductions received and corresponding replies and profiles as sent with each received invitation or introduction;

said attendees inviting other individuals, viewing accepted and rejected invitations, and viewing other individuals profile in any of said attendee's professional and personal network;

said attendee exchanging messages between network members;

said attendees storing references from any of professional and personal contacts said attendees controlling the content of said profile for input, storage, analysis, retrieval, or display to specific chosen authorized users or groups;

said attendees controlling multi-level privacy settings, said multi-levels comprising horizontal and vertical levels, said horizontal levels comprising any, many, or all fields in said individual's profile with corresponding privacy selection options to control display of each field content specifically to vertical levels, said vertical levels comprising access and privacy levels, said horizontal level comprising profile field-level settings, said vertical levels comprising groups, wherein said user controls access to said user profile content at both a profile level and a field level, with multiple horizontal and vertical privacy levels for each field and for an entire profile, wherein access permission is provided by said individual to any, multiple, or all horizontal and vertical privacy levels to read a defined group of records, but not necessarily all fields in each record;

said attendee creating sub-networks where professional networking and personal networking are separate from each other;

said event host hosting an event in physical space;

said event host making said event available virtually via said network to virtual users via said networking web-space, further comprising:

said virtual users accessing said event in real-time;

said virtual users participating in said event via chat rooms or discussion boards;

said virtual users receiving any of video and audio-streams of said event during or after said event; and said virtual users engage in professional networking from a location remote from the event with any of event attendees who are physically present at said event and virtual event attendees;

said attendee and said virtual users invite others to attend and network at said event using the said event networking system;

said event networking system proprietor monetizing said event management module by performing any of:

retaining, by said event networking system proprietor, a percentage of revenues generated by said event;

allowing event hosts to subscribe to event networking services using a flat fee contract model;

allowing event hosts to provide an event networking system which is partly or entirely paid by the sponsors or sponsored by companies in return for placement of their hyperlinks or advertisements in the event networking system;

establishing partnerships between said event networking system proprietor and online ticketing providers;

establishing revenue sharing partnerships between event networking system proprietor with service providers including, but not limited to, online registrations and event services;

providing either of fee-based, free, or advertising driven directory services and local listings with information concerning any of events, event attendees, and related services; and providing a win-n-redeem points program, wherein points are allotted to attendees based on attendee actions.

2. The method of claim 1, wherein said processor is further configured for:

detecting an event which a registered attendee is authorized to attend;

allowing said registered attendee to enter additional information desired or required in said profile and attaching said profile to the event; and providing said registered attendee with access to other event attendees' profiles.

3. The method of claim 1, wherein said processor is further configured for:

allowing said registered attendee to select another event in at least an additional event networking web-space to network from a list of events available in said events networking area of said event networking system;

said attendee submitting an authorization code and completing and submitting any of a professional and personal profile to be attached to the event; and said event networking system immediately providing said attendees with access to other event attendee profiles.

4. The method of claim 1, wherein said processor is further configured for:

allowing said attendees to provide any of voice and video information to said event networking system;

responsive thereto, said event networking system creating a voice and video profile for said attendees, wherein said profile can be viewed and listened to before, during, or after said event; and said system optionally converting voice to text and text to voice to allow searching of specific fields in an attendee profile.

5. The method of claim 1, wherein said processor is further configured for:

providing remote event access to make said event ubiquitously available anytime, anywhere, beyond physical limitations of time and space, wherein any potential attendee, anywhere can both attend said event from a location that is remote from said event and network with other event attendees without physically attending said event.

6. The method of claim 1, further comprising the step of: providing in-depth panel and session level networking.

7. The method of claim 1, further comprising the step of: said event host using any of the following options during said event for attendee identification:
a barcode scanner with bar-coded badges;
a plain badge and a business card scanner; and
an RFID badge.

8. The method of claim 7, further comprising the step of: scanning attendee badges or business cards during said event, when attendees enter panel and session rooms.

9. The method of claim 8, further comprising the step of: said event networking system obtaining attendee information from said attendee's badge or business card, wherein said attendee's profile is accessed to identify attendee-specific panel and session attendance information.

10. The method of claim 6, further comprising the step of: performing panel and session level information data entry, storage, and exchange amongst event attendees by the steps of:

said event host submitting said panel and session information to said event networking system, wherein said information is viewable by any attendee or prospect worldwide;

after entering attendee profile information, said event networking system returning a form to said attendees that allows said attendees to provide information before, during, or after said event about panels and sessions they are currently attending, plan to attend, or have already attended; and said event networking system providing said attendees with access to other attendees' profiles for each session or/and panel.

11. The method of claim 1, further comprising the step of: allowing individuals worldwide to post events of any nature in any realm and extend invitations to view and network at any of before, during, and after said events.

12. The method of claim 1, further comprising the step of: providing a real time communications facility to allow an attendee to meet online with at least one event participant, allowing said attendee to establish a meeting place where said participants can meet in person.

13. A distributed computer environment for allowing event attendees to network using a browser-based interface before, during, and after an event, said distributed computer environment comprising:

a server-based event management module operated by an event manager, said event management module comprising a processor, memory, and a network interface for accessing a network;

a plurality of clients coupled to said server-based event management module via said network, wherein said plurality of clients comprises at least one organization hosting an event and a plurality of potential attendees, wherein said at least one organization includes a event host primary event manager;

said event management module configured for providing said plurality of clients access to said event management module via a browser-based user interface comprising:

management tools for said event host primary event manager to register said at least one organization into an event networking system, for said event host primary event manager to establish an event networking web-space, and for said event host primary event manager with tools for preloading a plurality of attendee information directly into said event networking system via said event networking web-space, wherein said preloaded information is previously stored in said memory;

business networking tools for making said event available virtually via said network, wherein anyone, anywhere worldwide is provided with tools including
tools for attending said event virtually in real-time;
tools for participating via chat rooms or discussion boards;
tools for receiving any of video and audio-streams during or after said event; and tools for professional networking from a location remote from the event with any of event attendees who are physically present at said event and virtual event attendees;

wherein said webspace further comprises:
  user tools for controlling the content of said profile for input, storage, analysis, retrieval, and/or display to specific chosen authorized users or groups;
  user tools for providing said user with multi-level privacy settings, said multi-levels comprising horizontal and vertical levels, said horizontal levels comprising any, many, or all fields in said individual's profile with corresponding privacy selection options to control display of each field content specifically to vertical levels, said vertical levels comprising access and privacy levels, said horizontal level comprising profile field-level settings, said vertical levels comprising groups, wherein said user controls access to said user profile content at both a profile level and a field level, with multiple horizontal and vertical privacy levels for each field and for an entire profile, wherein access permission is provided by said individual to any, multiple, or all horizontal and vertical privacy levels to read a defined group of records, all fields in each record.

wherein said web space comprises any of:
  a sub-navigation area that allows an attendee to select and to pay for priority listing features;
  a sub-navigation area that allows said attendee to store invitations and introductions sent and corresponding profiles sent with each invitation or introduction;
  a sub-navigation area that allows said attendee to store invitations and introductions received and corresponding replies and profiles as sent with each received invitation or introduction;
  a sub-navigation area that allows said attendee to invite other individuals, view accepted and rejected invitations, and view individuals in any of said attendee's professional and personal network;
  a sub-navigation area for exchanging messages between network members; and
  a sub-navigation area that allows said attendee to store references from any of professional and personal contacts;
a plurality of sub-networks for keeping providing professional networking and personal networking separate from each other;
a mechanism that allows either of physically present and virtually present event attendees to invite others to attend and network at said event using the said event networking system;
attendee tools for potential attendees to individually register directly for said event via said event networking web-space;
wherein said preloading includes saving any of professional and personal information into profiles for registered attendees, wherein said profiles are saved in said event networking system; and the browser-based user interface further comprising:
networking tools to allow targeted networking between registered attendees at any of before, during, or after said event; and
monetization tools selected from among a group of monetization tools consisting of:
  tools for retaining, by an event networking system proprietor, a percentage of revenues generated by event hosts using the event networking system;
  tools for allowing event hosts to subscribe to event networking services using a flat fee contract model;
  tools for allowing event hosts to provide an event networking system which is partly or entirely paid by the sponsors or sponsored by companies in return for placement of their hyperlinks or advertisements in the event networking system;
  tools for establishing partnerships of the event networking system proprietor and online ticketing providers;
  tools for establishing revenue sharing partnerships of the event networking system proprietor with service providers including, but not limited to, online registrations and event services;
  tools for providing either of fee-based, free, or advertising driven directory services and local listings with information concerning any of events, event attendees, and related services; and
  tools for providing a win-n-redeem points program, wherein points are allotted to attendees based on attendee actions.

14. The distributed computer environment of claim 13, wherein said event comprises a plurality of sessions, wherein said browser-based user interface further comprises tools for allowing a registered users to check into a session, and wherein when a registered user checks in to a session, said registered user's profile indicates that said registered user checked in to said session, thereby informing other registered users who are networking with said registered user.

15. The method of claim 1 wherein said event is selected from among watching stage shows, watching sporting games, watching movies, playing various other games involving one or more players, conferences, seminars, tradeshows, company employee meetings, company vendor meetings, company customer meetings, arranging a picnic, parties, weddings, any other meetings involving more than one attendee and combinations thereof.

16. The method of claim 1 wherein said web-space includes tools for users to view videos, photos, web presentations and other media within the event networking system.

17. The method of claim 1 wherein said web-space includes tools for users to buy or bid on items such as merchandise and accessories associated with said event before, during or after the event.

18. The method of claim 1 wherein event networking comprises data storage and exchange of information amongst attendees physically or remotely attending said event.

19. The method of claim 1 wherein targeted networking comprises searching in the search module inside the system using specific key words or criteria including city, state, title, etc. that is specifically targeted towards the searching attendees needs and then networking with those specifically targeted list of attendees.

* * * * *